US 11,880,745 B1

(12) United States Patent
Griffin et al.

(10) Patent No.: US 11,880,745 B1
(45) Date of Patent: Jan. 23, 2024

(54) NOISY INTERMEDIATE-SCALE QUANTUM SERVICE ANALYSIS FOR CLOUD BASED SUPPORT

(71) Applicant: Red Hat, Inc., Raleigh, NC (US)

(72) Inventors: Leigh Griffin, Waterford (IE); Stephen Coady, Waterford (IE)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/899,266

(22) Filed: Aug. 30, 2022

(51) Int. Cl.
G06F 11/34 (2006.01)
G06N 10/80 (2022.01)

(52) U.S. Cl.
CPC ......... *G06N 10/80* (2022.01); *G06F 11/3409* (2013.01)

(58) Field of Classification Search
None
See application file for complete search history.

(56) References Cited

U.S. PATENT DOCUMENTS

| | | | |
|---|---|---|---|
| 11,086,665 | B2 | 8/2021 | Griffin et al. |
| 2020/0160205 | A1 | 5/2020 | Leipold et al. |
| 2021/0334237 | A1 | 10/2021 | Coady et al. |
| 2021/0374583 | A1 | 12/2021 | Griffin et al. |
| 2021/0406747 | A1* | 12/2021 | Coady ................ G06N 10/80 |
| 2022/0027323 | A1 | 1/2022 | Coady et al. |
| 2022/0050710 | A1 | 2/2022 | Bishop et al. |
| 2022/0237146 | A1* | 7/2022 | Griffin ................ G06N 10/60 |
| 2023/0244459 | A1* | 8/2023 | Zou .................... G06F 8/447 717/140 |

OTHER PUBLICATIONS

Tzvetan S. Metodi et al., "Scheduling Physical Operations in a Quantum Information Processor" Proc. SPIE 6244, Quantum Information and Computation IV, 62440 (May 12, 2006).

* cited by examiner

*Primary Examiner* — Craig C Dorais
(74) *Attorney, Agent, or Firm* — Womble Bond Dickinson (US) LLP

(57) ABSTRACT

A system and method of selectively distributing blocks of a quantum assembly language (QASM) file over resources of a quantum computing environment to optimize performance of the quantum computing environment. The method includes receiving a quantum assembly language (QASM) file comprising a plurality of blocks. The method includes calculating a plurality of complexity scores each indicative of a degree of complexity to process a respective block of the plurality of blocks. The method includes calculating a plurality of risk scores associated with a pool of quantum computers, each risk score is indicative of a likelihood of a respective quantum computer of the pool of quantum computers entering an undesired state responsive to processing a respective block of the plurality of blocks. The method includes selectively distributing, based on the plurality of risk scores, each of the plurality of blocks to a single quantum computer of the pool of quantum computers.

20 Claims, 5 Drawing Sheets

300

```
receiving a quantum assembly language (QASM) file and
a performance setting for the QASM file, the QASM file
comprising a plurality of blocks
302
```

```
calculating a plurality of complexity scores each indicative
of a degree of complexity to process a respective block of
the plurality of blocks based on the performance setting
304
```

```
calculating, by a processing device of a classical computer
based on the plurality of complexity scores, a plurality of
risk scores associated with a pool of quantum computers,
each risk score is indicative of a likelihood of a respective
quantum computer of the pool of quantum computers
entering an undesired state responsive to processing a
respective block of the plurality of blocks
306
```

```
selectively distributing, based on the plurality of risk
scores, each of the plurality of blocks to a single quantum
computer of the pool of quantum computers to cause the
single quantum computer to generate a block output by
processing the block and send the block output to the
processing device
308
```

FIG. 3

NOISY INTERMEDIATE-SCALE QUANTUM SERVICE ANALYSIS FOR CLOUD BASED SUPPORT

TECHNICAL FIELD

The present disclosure relates generally to noisy intermediate-scale quantum (NISQ) technology, and more particularly, to systems and methods for selectively distributing blocks of a quantum assembly language (QASM) file over resources of a quantum computing environment to optimize performance of the quantum computing environment.

BACKGROUND

Noisy Intermediate-Scale Quantum (NISQ) is a rapidly-emerging technology that uses the laws of quantum mechanics to solve complex problems. Quantum computers with 50-100 qubits may be able to perform tasks which surpass the capabilities of today's classical digital computers, but the noise in quantum gates limit the size of quantum circuits that can be executed reliably. While NISQ devices will be useful tools for exploring many-body quantum physics, and may have other useful applications, solutions to these limitations should be addressed before NISQ can be considered a reliable technology.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 3 is a flow diagram depicting a method for selectively distributing blocks of a QASM file over resources of a quantum computing environment to optimize performance of the quantum computing environment, according to some embodiments.

DETAILED DESCRIPTION

Figure 1:
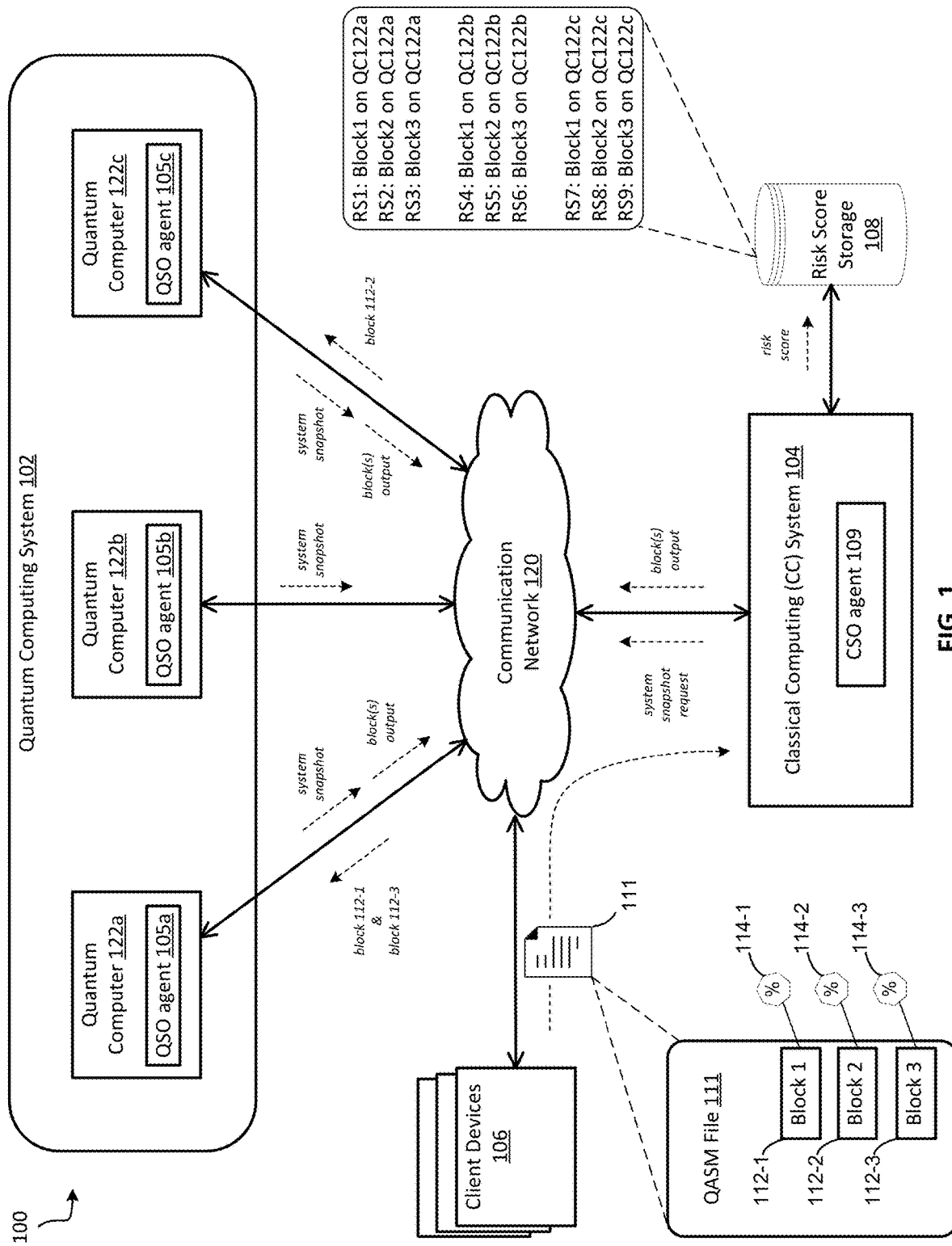
FIG. 1 is a block diagram depicting an example environment for selectively distributing blocks of a QASM file over resources of a quantum computing environment to optimize performance of the quantum computing environment, according to some embodiments.

The NISQ era will have a heavy reliance on utilizing the power of classical computing to de-risk and improve the experience as the technology matures. The resources that support the NISQ service, and specifically the hardware demands, present a technological problem that results in wastage and non-optimal usage in the classical sphere. For example, multiple quantum systems may be available in a pool manner for an end user to execute. Those quantum systems may include individual hardware enclosures, such that the capability of each quantum system might be different. The challenge for an end user, however, is to select the right system when the end user might not have the nuanced knowledge to infer the quantum-specific capabilities (e.g. if they require teleportation, understanding the setup and environment might not be visible to them, they just want an application programming interface (API) to invoke) of the quantum system, as well as the general profile of resources required to have an optimal run. This challenge is mirrored from the quantum system perspective, as from an optimization perspective, right sizing the request to the right quantum system, or even within a system to the right hardware enclosure and not locking down more resources than necessary to execute a program.

Aspects of the present disclosure address the above-noted and other deficiencies by selectively distributing blocks of a quantum assembly language (QASM) file over resources of a quantum computing environment to optimize performance of the quantum computing environment.

As discussed in greater detail below, a NISQ classical support optimizer (CSO) agent executes on the hardware of a classical computer, and has API level access to a suite or pool of quantum systems (e.g., quantum computers, quantum machines, etc.). The CSO agent ingests, as an input, a QASM file and performance settings that indicate the proposed hardware that the file is to be deployed upon. The CSO agent parses the QASM file to infer service requirements (e.g., number of qubits, qubit type, particular quantum phenomenon, services needed) for processing the one or more functional blocks ("blocks") of the QASM file. A QASM file can be parsed because it is well-defined programmatically, meaning that the CSO agent is able to abstract the capabilities of the QASM file. The CSO agent performs a cyclomatic complexity analysis on the QASM file using static analysis tools (e.g., SonarQube) in order to provide a risk score (or risk ranking) per block of the QASM file based on the complexity to process the block.

Using this information, the CSO agent can poll the APIs (e.g., task manager, qubit registry, and scheduler) of the quantum hardware of each quantum system in the pool of quantum systems to ascertain the system's current status, which may indicate a current qubit availability, a current system noise, a current error count, a current temperature, a relation time (e.g., t1 time), a coherence time (e.g., t2 time), a utilization number, a current processing load, and/or current availability of services (e.g., whether teleportation is enabled). The CSO agent can interface with the data available for error corrections to gain an understanding of the risk associated with the execution on the quantum system and similarly query the qubit registry to check if any other services are running one or more quantum phenomena (e.g., superposition, interference, entanglement) on that quantum computer. The risk is made up of an algorithm that takes in as inputs the error rate, the noise on the system, the temperature, the load, identifiers to other services that are utilizing a quantum phenomenon, the qubit material, and/or and the qubit history (e.g., for degradation purposes). The QASM file has complimenting decorations to indicate the optimization needs, such as processing speed, processing efficiency, processing quality (e.g., measurement accuracy, measurement resolution), etc. Taking both as inputs, the CSO agent calculates a risk score that can be used to determine whether to execute on any of the quantum computers in the pool of quantum systems. That is, if the risk scores meet the risk criteria thresholds (which may be configurable using simple rules), the CSO agent will pick the most optimal quantum computer based on the risk criteria threshold and present a list of other quantum computers that might meet the criteria, but have a different risk profile. Advantageously, this could allow the end user to run the same service on multiple quantum enclosures and receive multiple results, allowing them make a more informed decision. Using all of this information, the CSO agent attempts to make a smart scheduling decision, to send the request to the most optimal system.

The embodiments of the present disclosure may implement various features to provide benefits over the conventional system. For one, each quantum computer in the pool of quantum systems may dynamically expand and/or contract as new hardware (e.g., qubits) is removed. Each quantum computer may also have different unique physical characteristics. The CSO agent of the classical computer may perform a combinatorial analysis of quantum specific phenomenon such as entanglement to ensure maximum safety for running services and to give the soon-to-be scheduled service a quieter environment. This means that the CSO agent can look at the holistic running of the pool of quantum systems to infer when is the best time to run a particular quantum computer and take into account additional metadata including, for example, error count, system noise, a relation time (e.g., a t1 time), a coherence (e.g., a t2 time), and/or utilization numbers. This would allow the CSO agent to take in multiple data points to give a more holistic response rather than a narrower view of one element of safety (e.g., load).

Furthermore, a configurable risk-based profile which can be encoded within the QASM file and interpretable (by the CSO agent) to optimize for various metrics including, for example, speed, efficiency, quality, system noise, and/or errors. The risk profile can be derived from historical runs of one or more blocks of a QASM file, where the accuracy and block outputs (e.g., results) can be graded by the end user or by artificial intelligence (AI) and/or machine learning (ML) kind of techniques. This allows an element of data-driven design and allows for orchestration services (e.g., OpenShift) to help prioritize what kind of results would be desired, as well as what quantum system to deploy them on, as each quantum system has specific capabilities and sensitivities allowing for a dynamic scale to form. As this is a metadata rich area, by having it live with the QASM file the CSO agent can create different operating approaches based on what the needs of that particular system or algorithm might be, effectively moving scheduler level intelligence to the QASM files.

In an illustrative example, a classic computing (CC) system receives a quantum assembly language (QASM) file and a performance setting for the QASM file. The QASM file includes a plurality of functional blocks ("blocks"). The CC system calculates a plurality of complexity scores each indicative of a degree of complexity to process a respective block of the plurality of blocks based on the performance setting. The CC system calculates, based on the plurality of complexity scores, a plurality of risk scores associated with a pool of quantum computers. Each risk score is indicative of a likelihood of a respective quantum computer of the pool of quantum computers entering an undesired state responsive to processing a respective block of the plurality of blocks. The CC system selectively distributes, based on the plurality of risk scores, each of the plurality of blocks to a single quantum computer of the pool of quantum computers to cause the single quantum computer to generate a block output by processing the block and send the block output to the processing device.

FIG. 1 is a block diagram depicting an example environment for selectively distributing blocks of a QASM file over resources of a quantum computing environment to optimize performance of the quantum computing environment, according to some embodiments. The environment 100 includes a quantum computing system 102 (sometimes referred to as, "quantum computing pool"), a classical computer (CC) system 104, and one or more client devices 106 that are each communicatively coupled together via a communication network 120. The quantum computing system 102 includes quantum computers 122 (e.g., quantum computers 122a, 122b, 122c) that are each communicatively coupled together via the communication network 120. The environment 100 includes a risk score storage 108 that is communicably coupled to the CC system 104, and which the CC system 104 uses to store risk scores associated with the quantum computers 122 of the quantum computing system 102.

The communication network 120 may be a public network (e.g., the internet), a private network (e.g., a local area network (LAN) or wide area network (WAN)), or a combination thereof. In one embodiment, communication network 120 may include a wired or a wireless infrastructure, which may be provided by one or more wireless communications systems, such as wireless fidelity (Wi-Fi) connectivity to the communication network 120 and/or a wireless carrier system that can be implemented using various data processing equipment, communication towers (e.g. cell towers), etc. The communication network 120 may carry communications (e.g., data, message, packets, frames, etc.) between any other the computing device.

A QASM file, such as QASM file 111, is a simple text-format language for describing acyclic quantum circuits composed from single qubit, multiply controlled single-qubit gates, multiple-qubit, and multiple-qubit controlled multiple-qubit gates. A QASM file includes a collection of quantum circuits, or quantum basic blocks, together with associated classical control instructions and classical object code needed at run-time. For example, QASM file 111 includes three blocks 112 (e.g., block 112-1, block 112-2, and block 112-3), where block 112-1 corresponds to block 1, block 112-2 corresponds to block 2, and block 112-3 corresponds to block 3. A basic block is a straight-line code sequence with no branches (except at the entry and exit points). Since feedback can occur on multiple time scales, the quantum circuits may include instructions for fast feedback. Other classical control instructions outside of the quantum circuit basic block include, for example, run-time parameter computations and measurement-dependent branches. External classical object code could include algorithms to process measurement outcomes into control flow conditions or results, or to generate new basic blocks on the fly.

Each of the quantum computers 122 execute a quantum support optimizer (QSO) agent 105. Specifically, the quantum computer 122a executes a QSO agent 105a, the quantum computer 122b executes a QSO agent 105b, and the quantum computer 122c executes a QSO agent 105c. The QSO agent 105 exposes APIs of its quantum hardware (e.g., qubits, memory, etc.) and/or applications (e.g., task manager, qubit registry, scheduler, etc.) that are executing on its quantum hardware to other quantum computers 122 and/or classical computers (e.g., CC system 104, client devices 106). By exposing the APIs, the other quantum computers 122 and/or classical computers may poll the APIs to acquire information about the one or more resources of the quantum computer, and use the information to generate a snapshot of the quantum computer 122. The snapshot indicates a quantum hardware type, an application type, and a current status of the quantum hardware and applications. For example, the snapshot may indicate a current qubit availability (e.g., 3 qubits out of a total of 4 qubits are available, a particular qubit has 25% availability, etc.), a qubit material (e.g., niobium and aluminum, patterned on a silicon substrate), a qubit history (which is indicative of a degree of degradation of the qubit), a current system noise, a current error count, a current temperature, a current processing load, a current availability of services, and/or whether other services are utilizing a particular quantum phenomena (e.g., superposition, interference, entanglement).

Alternatively, the QSO agent 105 may generate a snapshot of the one or more resources of the quantum computer in response to receiving a request (shown in FIG. 1 as, "system snapshot request") for the snapshot from the CC system 104. For example, the QSO agent 105 may poll the APIs of the quantum computer in which the QSO agent 105 is executing upon to gather the quantum hardware and applications information, and use that information to generate a snapshot of the quantum computer 122.

Still referring to FIG. 1, the CC system 104 executes a classical support optimizer (CSO) agent 109 that receives the QASM file 111 from a client device 106. The QASM file 111 includes the three blocks 112 (e.g., block 112-1, block 112-2, and block 112-3) that each involve a particular degree of complexity for the quantum computer 122 to process the block based on a performance setting. The client device 106 may include the performance setting in the QASM file 111, or may send the performance setting to the CC system 104 in a different message (either before or after sending the QASM file 111.) A user of the client device 106 may configure the performance setting via an application that is executing on the client device 106. The performance setting may include a processing speed (e.g., slow, medium, fast), a processing accuracy (e.g., low accuracy, medium accuracy, high accuracy), or a processing efficiency (e.g., low-power consumption, medium-power consumption, high-power consumption).

Configuring the performance settings involves trade-offs. For example, if the performance setting indicates that the processing speed should be configured in a fast mode, then the CC system 104 may achieve this by (1) configuring the processing efficiency in a high-power consumption mode that increases the measurement accuracy, or (2) configuring the processing accuracy is in a low accuracy mode that decreases processing time. Alternatively, if the performance setting indicates that the processing efficiency should be configured in a low-power consumption mode, then the CC system 104 may achieve this by (1) configuring the processing speed in a slow mode that decreases measurement accuracy, or (2) configuring the processing speed in a slow mode that increases the processing time, but maintain the measurement accuracy.

When the quantum computer 122 processes (e.g., ingests) a block 112 of the QASM file 111, the temperature of the quantum computer 122 will proportionally increase based on the processing complexity of the block. And, as the temperature increases, there will be a proportional increase in the quantum computer's 122 processing error count, which is a metric that is indicative of the overall health of the quantum computer 122. Furthermore, if the temperature of the quantum computer 122 exceeds a predefined threshold (which may vary from quantum computer 122 to quantum computer 122), then the quantum computer 122 may enter an undesired state. For example, excess heat that is produced as a result of the quantum computer 122 processing a block 112 of the QASM file 111 could cause the temperature of the quantum computer to exceed a predefined threshold temperature. Consequently, the processing quality (e.g., accuracy, resolution, and/or efficiency) of the quantum computer 122 could severely degrade (e.g., resulting in excess processing errors), and/or the quantum computer 122 might enter a chaotic meltdown, which can cause structural damage (e.g., temporary or permanent) to the quantum computer 122.

The change in temperature, or delta temperature ($\Delta T$), of the quantum computer 122 as a result of the quantum computer 122 processing a block 112 is proportionally and directly related to the processing complexity (sometimes referred to as, "complexity" or "complexity score") of the block 112. For example, if the processing complexity of block 112-1 is 20% and the processing complexity of block 112-2 is 50%, then the delta temperature ($\Delta T_{112\text{-}2}$) for quantum computer 122 to process block 112-2 is greater than the delta temperature ($\Delta T_{112\text{-}1}$) for quantum computer 122 to process block 112-1. However, if the processing complexity of block 112-1 is 70% and the processing complexity of block 112-2 is 50%, then the delta temperature ($\Delta T_{112\text{-}1}$) for quantum computer 122 to process block 112-1 is greater than the delta temperature ($\Delta T_{112\text{-}2}$) for quantum computer 122 to process block 112-2. The blocks 112 of the QASM file 111 may each have the same processing complexity or different processing complexity.

The CC system 104 ascertains the processing complexity of the QASM file 111 by parsing the QASM file 111 to identify each block (e.g., block 112-1, block 112-2, and block 112-3) of the QASM file 111. The CC system 104 calculates a complexity score for each block 112 of the QASM file 111, where each complexity score indicates a degree of complexity to process a respective block of the plurality of blocks based on the performance setting. For example, the CC system 104 calculates a complexity score 114-1 for the block 112-1, a complexity score 114-2 for the block 112-2, and a complexity score 114-3 for the block 112-3.

The CC system 104 may calculate the processing complexity for a block 112 based on the type of algorithm that is included the block 112. For example, the CC system 104 may determine that block 112-1 includes a first type of algorithm and block 112-2 includes a second type of algorithm. If the CC system 104 determines that the first type of algorithm is more complex than the second type of algorithm, then the CC system 104 will add a first offset to the complexity score 114-1 and a second offset to the complexity score 114-2, where the first offset is greater than the second offset. An algorithm may be based on the one of the following: a quantum Fourier transform (e.g., Shor's algorithm), an amplitude amplification (e.g., Grover's algorithm, Quantum counting), a quantum walks, a BQP (bounded-error quantum polynomial time)-complete, a hybrid quantum/classical algorithm (e.g., quantum approximate optimization algorithm (QAOA), a variational quantum Eigen solver, a contracted quantum Eigen solver).

The CC system 104 may also calculate the processing complexity for a block 112 based on the number of algorithms that are included in the block 112. For example, the CC system 104 may determine that block 112-1 includes 3 algorithms and block 112-2 includes 1 algorithm. The CC system 104 calculates a difference between the number of algorithms in the blocks 112. If the CC system 104 determines that block 112-1 includes more algorithms than that which are included in block 112-2, then the CC system 104 might add a first offset to the complexity score 114-1 and a second offset to the complexity score 114-2, where the differences between the first offset and the second offset is proportional to the difference between the number of algorithms in the blocks 112.

The CC system 104 may also calculate the processing complexity for a block 112 based on the type and/or quantity of resources needed to process the block 112. For example, the CC system 104 may determine that the resource requirements to process block 112-1 include a minimum of 1 qubit, the resource requirements to process block 112-2 include a minimum of 4 qubits, and the resource requirements to process block 112-3 include a minimum of 2 qubits. The CC system 104 calculates a first difference between the quantity of resource requirements (e.g., 1 qubit) to process block 112-1 and the resource requirements (e.g., 2 qubits) to process block 112-3. The CC system 104 calculates a second difference between the quantity of resource requirements (e.g., 4 qubits) to process block 112-2 and the resource requirements (e.g., 2 qubits) to process block 112-3. The CC system 104 might add a first offset to the complexity score 114-3 that is proportional to the first difference, and add a second offset to the complexity score 114-2 that is proportional to the second difference.

Thus, the CC system 104 may also calculate the processing complexity for a block 112 based on the type of algorithm that is included the block 112, based on the number of algorithms that are included in the block 112, and/or based on the type (or quantity) of resources needed to process the block 112.

The CC system 104 may adjust the minimum resource requirements to process a block 112 based on the performance setting. For example, TABLE 1 shows non-limiting examples of how the CC system 104 may adjust the minimum resource requirements (e.g., number of qubits) to process a block 112 having a particular processing complexity (shown as, "complexity score") in order to meet the requirements of the performance setting, and how that adjustment in the minimum resource requirement might cause a proportional and direct change in the temperature of the quantum computer 122.

Using the techniques discussed herein, the CC system 104 may determine that a block 112 has a complexity score of LOW, MEDIUM, or HIGH. A block 112 with a HIGH score is more complex for a quantum computer 122 to process as compared to a block 112 with a MEDIUM score, which is more complex for the quantum computer 122 to process as compared to a block 112 with a LOW score. The performance setting may indicate that the quantum computer 122 is to process each of the block 112 of the QASM file 111 using a default number of qubits. By processing the block using the default number of qubits, the quantum computer 122 is able to produce a block output that matches a desired result. The default number of qubits to produce the desired result may be pre-determined based on historical runs of the block 112, where the accuracy and block outputs (e.g., results) can be graded by the end user or by artificial intelligence (AI) and/or machine learning (ML) kind of techniques.

Table 1 shows the quantity of qubits for the quantum computer 122 to use when processing a block 112 according to the performance file. The possible quantities (or groups) of qubits that could be used include an "L1" quantity, "L2" quantity, . . . , up to an "L9" quantity. Each L(i) quantity represents one or more qubits, where a higher i indicates a greater number of qubits. For example, an L1 quantity may inform the CC system 104 to use 1 qubit when processing the block 112, an L2 quantity may inform the CC system 104 to use 2 qubits when processing the block 112, and the L3 quantity may inform the CC system 104 to use 3 qubits when processing the block 112. Alternatively, an L1 quantity may inform the CC system 104 to use 4 qubits when processing the block 112, an L2 quantity may inform the CC system 104 to use 7 qubits when processing the block 112, and the L3 quantity may inform the CC system 104 to use 10 qubits when processing the block 112.

TABLE 1

| Complexity Score of Block (%) | QASM File Performance Setting (e.g., accuracy) | # of Qubits to Process the Block | Delta temperature (ΔT) as Result of Processing the Block |
|---|---|---|---|
| LOW | decreased | L1 Quantity | L1 delta temp |
| LOW | default | L2 Quantity | L2 delta temp |
| LOW | increased | L3 Quantity | L3 delta temp |
| MEDIUM | decreased | L4 Quantity | L2 delta temp |
| MEDIUM | default | L5 Quantity | L3 delta temp |
| MEDIUM | increased | L6 Quantity | L4 delta temp |
| HIGH | decreased | L7 Quantity | L3 delta temp |
| HIGH | default | L8 Quantity | L4 delta temp |
| HIGH | increased | L9 Quantity | L5 delta temp |

Table 1 also shows the change in temperature, or delta temperature (ΔT), of the quantum computer 122 as a result of the quantum computer 122 processing a block 112. The possible delta temperatures include an "L1" delta temperature, an "L2" delta temperature, . . . , up to an "L9" delta temperature. Each L(i) delta temperature represents a change in temperature, where a higher i indicates a greater change in temperature. For example, an L1 delta temperature may be 10 degrees Celsius (C), an L2 delta temperature may be 15 degrees C., and an L3 delta temperature may be 20 degrees C.

In an illustrative example, if the complexity score 114-1 for block 112-1 is LOW and the performance setting indicates to use a default number of qubits, then the CC system 104 determines that a quantum computer 122 will increase by the L2 delta temperature when processing the block 112-1 using an L2 quantity of qubits. However, if the performance setting indicates to use a decreased number of qubits, then the CC system 104 determines that the quantum computer 122 will increase by the L1 delta temperature when processing the block 112-1 using an L1 quantity of qubits. Otherwise, if the performance setting indicates to use an increased number of qubits, then the CC system 104 determines that the quantum computer 122 will increase by the L3 delta temperature when processing the block 112-1 using an L3 quantity of qubits.

Thus, the CC system 104 is able to predict the amount of temperature change that the quantum computer 122 will likely experience as a result of processing a particular block 112 of a QASM file 111 according to the performance setting.

The CC system 104 may calculate a plurality of risk scores that are associated with the quantum computing system 102, where each risk score is indicative of a likelihood of a particular quantum computer 122 of the quantum computing system 102 to enter an undesired state as a result of processing a particular block 112 of the QASM file 111 according to the performance file. An undesired state is when a temperature of the quantum computer 122 exceeds a maximum temperature limit of the quantum computer 122, when an error count of the quantum computer 122 exceeds a maximum error limit of the quantum computer 122, and/or when a network packet drop rate exceeds a maximum network packet drop rate of the quantum computer 122.

The CC system 104 may store the risk scores associated with the quantum computers 122 of the quantum computing system 102 in the risk score storage 108. For example, RS1 may be a risk score for quantum computer 122a to process block 112-1, RS2 may be a risk score for quantum computer 122a to process block 112-2, and RS3 may be a risk score for quantum computer 122a to process block 112-3. As another example, RS4 may be a risk score for quantum computer 122b to process block 112-1, RS5 may be a risk score for quantum computer 122b to process block 112-2, and RS6 may be a risk score for quantum computer 122b to process block 112-3. As another example, RS7 may be a risk score for quantum computer 122c to process block 112-1, RS8 may be a risk score for quantum computer 122c to process block 112-2, and RS9 may be a risk score for quantum computer 122c to process block 112-3.

Still referring to Table 1 and in an illustrative example, the CC system 104 may calculate a risk score for quantum computer 122a, 122b, and quantum computer 122c to each process block 112-1. If the complexity score 114-1 for block 112-1 is LOW and the performance setting indicates to use a default number of qubits, then the CC system 104 determines that a quantum computer 122 will increase by the L2 delta temperature (e.g., 30 C) when processing the block 112-1 using an L2 quantity of qubits. The CC system may poll each of the quantum computers 122 for their respective snapshots to determine the current temperature of each of the quantum computers 122. The CC system 104 may determine, from a set of configurable rules, the maximum temperature limit for each of the quantum computers 122. The CC system 104 may compare each of the current temperatures against the maximum temperature limit to determine if the quantum computer 122 would be at risk for entering the undesired state as a result of processing the block 112-1. For example, the CC system 104 adds the L2 delta temperature (e.g., 30 C) to the current temperature (e.g., 90 C) of quantum computer 122a and subtracts this sum (e.g., 120C) from the maximum temperature limit (e.g., 100 C) for quantum computer 122a to calculate a predicted temperature-to-max value (e.g., −20 C) for quantum computer 122a. The CC system 104 also adds the L2 delta temperature (e.g., 30 C) to the current temperature (e.g., 60 C) of quantum computer 122b and subtracts this sum (e.g., 90C) from the maximum temperature limit (e.g., 120 C) for quantum computer 122b to calculate a predicted temperature-to-max value (e.g., 30 C) for quantum computer 122b. The CC system 104 also adds the L2 delta temperature (e.g., 30 C) to the current temperature (e.g., 30 C) of quantum computer 122c and subtracts this sum (e.g., 60C) from the maximum temperature limit (e.g., 100 C) for quantum computer 122c to calculate a predicted temperature-to-max value (e.g., 40 C) for quantum computer 122c.

According to the previous example, the quantum computer 122a would enter an undesired state (e.g., meltdown) if the CC system 104 sends the block 112-1 to the quantum computer 122a for processing because the final temperature of the quantum computer 122a would eventually exceed its maximum temperature limit by up to 20 C as a result of processing the block 112-1. For this reason, the quantum computer 122a would decide to not send the block 112-1 to the quantum computer 122a. Instead, the CC system 104 would send the block 112-1 to quantum computer 122c for processing because the final temperature of the quantum computer 122c after processing the block 112-1 would have a 40C temperature to its maximum temperature limit, which is greater than the 30 C temperature margin that the quantum computer 122c would have to its maximum temperature limit if quantum computer 122c instead processed the block 112-1.

The CC system 104 selectively distributes, based on the plurality of risk scores, each of the plurality of blocks 112 to a single quantum computer 122 of the quantum computing system 102 to cause the quantum computer 122 to generate a block output (shown in FIG. 1) by processing the block 112. The quantum computer 122 then sends the block output to the CC system 104. The CC system 104 aggregates the plurality of block outputs into an aggregated block output, where the ordering of the block outputs in the aggregated block output matches the original ordering of the blocks 112 in the QASM file 111. For example, the CC system 104 may determine that the QASM file 111 includes blocks that are ordered as: block 112-1, block 112-2, and block 112-3. The CC system 104 may receive a first block output from quantum computer 122a, which quantum computer 122a produced after processing block 112-1; the CC system 104 may receive a second block output from quantum computer 122b, which quantum computer 122b produced after processing block 112-2; and the CC system 104 may receive a third block output from quantum computer 122c, which quantum computer 122c produced after processing block 112-3. The CC system 104 may aggregate and arrange the block outputs such that the aggregated block output includes (in the following order) the first block output, the second block output, and third block output.

The CC system 104 may display the aggregated block output on a screen of the CC system 104 and/or send the aggregated block output to the client device 106 to cause the client device 106 to display the aggregated block output on a screen of the client device 106.

Although FIG. 1 shows only a select number of computing devices (e.g., CC system 104, quantum computer 122, client device 106), the environment 100 may include any number of computing devices that are interconnected in any arrangement to facilitate the exchange of data between the computing devices.

Figure 2B:
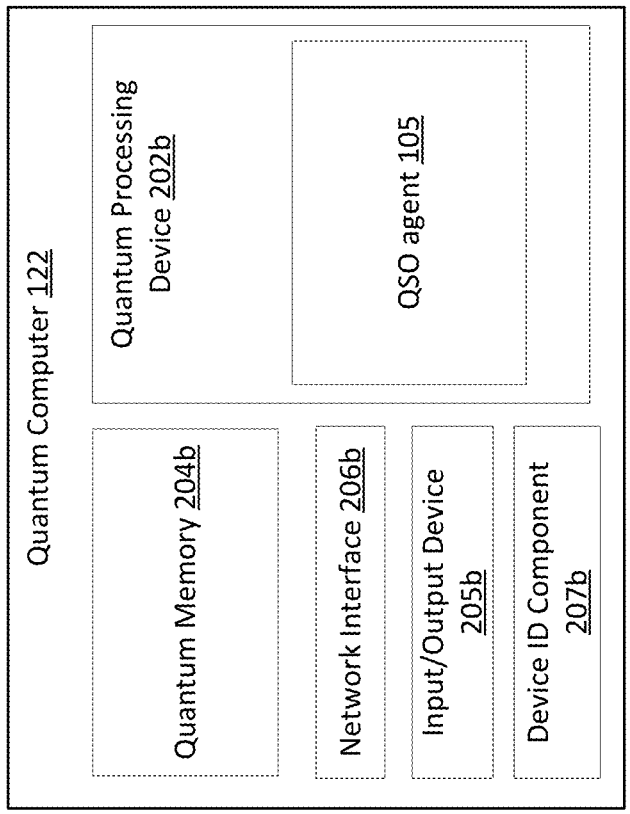
FIG. 2B is a block diagram depicting an example quantum computer 122 of the quantum computing system 102 in FIG. 1, according to some embodiments.
Figure 2A:
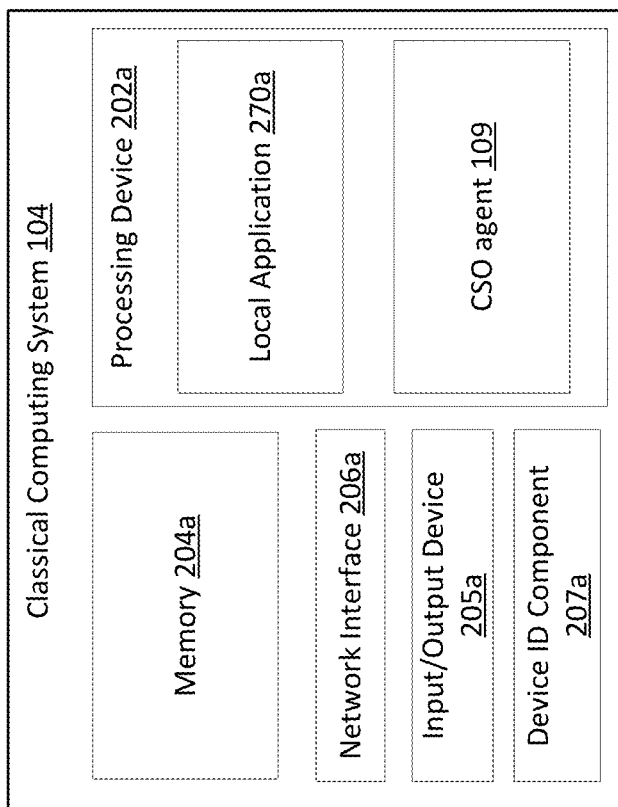
FIG. 2A is a block diagram depicting an example of the classical computing system (CC) system 104 in FIG. 1, according to some embodiments.

FIG. 2A is a block diagram depicting an example of the classical computing system (CC) system 104 in FIG. 1, according to some embodiments. While various devices, interfaces, and logic with particular functionality are shown, it should be understood that the DCM system 104 includes any number of devices and/or components, interfaces, and logic for facilitating the functions described herein. For example, the activities of multiple devices may be combined as a single device and implemented on a same processing device (e.g., processing device 202a), as additional devices and/or components with additional functionality are included.

The CC system 104 includes a processing device 202a (e.g., general purpose processor, a PLD, etc.), which may be composed of one or more processors, and a memory 204a (e.g., synchronous dynamic random access memory (DRAM), read-only memory (ROM)), which may communicate with each other via a bus (not shown).

The processing device 202a may be provided by one or more general-purpose processing devices such as a microprocessor, central processing unit, or the like. In some embodiments, processing device 202a may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some embodiments, the processing device 202a may comprise one or more special-purpose processing devices such as an application specific integrated circuit (ASIC), a field programmable gate array (FPGA), a digital signal processor (DSP), network processor, or the like. The processing device 202a may be configured to execute the operations described herein, in accordance with one or more aspects of the present disclosure, for performing the operations and steps discussed herein.

The memory 204a (e.g., Random Access Memory (RAM), Read-Only Memory (ROM), Non-volatile RAM (NVRAM), Flash Memory, hard disk storage, optical media, etc.) of processing device 202a stores data and/or computer instructions/code for facilitating at least some of the various processes described herein. The memory 204a includes tangible, non-transient volatile memory, or non-volatile memory. The memory 204a stores programming logic (e.g., instructions/code) that, when executed by the processing device 202a, controls the operations of the CC system 104. In some embodiments, the processing device 202a and the memory 204a form various processing devices and/or circuits described with respect to the CC system 104. The instructions include code from any suitable computer programming language such as, but not limited to, C, C++, C#, Java, JavaScript, VB Script, Perl, HTML, XML, Python, TCL, and Basic.

The processing device 202a may include and/or execute an application (shown in FIG. 2A as, "Local Application 270a") that is displayed on a computer screen of the CC system 104, and is configured to display information (e.g., block outputs, aggregated block outputs, lists, etc.) received from the CSO agent 109. For example, the application 270a may be configured to receive a list that includes one or more risk scores that are associated with the quantum computing system 102. The application 270a may be configured to display the list.

The processing device 202a may execute a classical support optimizer (CSO) agent 109 that is configured to receive a quantum assembly language (QASM) file 111 and a performance setting for the QASM file 111. The QASM file 111 may include a plurality of blocks 112 (e.g., block 112-1, block 112-2, block 112-3).

The CSO agent 109 may be configured to calculate a plurality of complexity scores that are each indicative of a degree of complexity to process a respective block 112 of the plurality of blocks 112 based on the performance setting. For example, the CSO agent 109 may be configured to parse the QASM file to identify each block 112 of the plurality of blocks 112. The CSO agent 109 may be configured to determine, for each block of the plurality of blocks, resource requirements (e.g., number of qubits, etc.) for processing the block 112 according to the performance setting. As another example, the CSO agent 109 may be configured to determine, for a first quantum computer (e.g., quantum computer 122a) of the quantum computing system 102, a first potential impact to the current status information of the first quantum computer responsive to processing a first block of the plurality of blocks. The CSO agent 109 may be configured to determine, for a second quantum computer (e.g., quantum computer 122b) of the quantum computing system 102, a second potential impact to the current status information of the second quantum computer responsive to processing the first block of the plurality of blocks.

The CSO agent 109 may be configured to calculate, by a processing device of a classical computer based on the plurality of complexity scores, a plurality of risk scores associated with a quantum computing system 102, each risk score is indicative of a likelihood of a respective quantum computer 122 of the quantum computing system 102 entering an undesired state responsive to processing a respective block 112 of the plurality of blocks 112.

The CSO agent 109 may be configured to selectively distribute, based on the plurality of risk scores. In some embodiments, each of the plurality of blocks to a single quantum computer 122 of the quantum computing system 102 to cause the single quantum computer 122 to generate a block output by processing the block and send the block output to the processing device.

In some embodiments, the performance setting is indicative of at least one of a processing speed, a processing accuracy, or a processing efficiency.

The CSO agent 109 may be configured to poll, for each quantum computer 122 of the quantum computing system 102, one or more APIs of the quantum computer 122 to obtain a plurality of snapshots associated with the quantum computing system 102. In some embodiments, each snapshot of the plurality of snapshots indicates current status information of one or more resources of a respective quantum computer 122 of the quantum computing system 102.

In some embodiments, the CSO agent 109 may be configured to calculate, based on the plurality of complexity scores, the plurality of risk scores associated with the quantum computing system 102 is further based on the plurality of snapshots associated with the quantum computing system 102.

In some embodiments, the current status information may indicate a current qubit availability (e.g., 3 qubits out of a total of 4 qubits are available, a particular qubit has 25% availability, etc.), a qubit material (e.g., niobium and aluminum, patterned on a silicon substrate), a qubit history (which is indicative of a degree of degradation of the qubit), a current system noise, a current error count, a current temperature, a current processing load, a current availability of services, and/or whether other services are utilizing a particular quantum phenomena (e.g., superposition, interference, entanglement).

The CSO agent 109 may be configured to calculate a first future status information of the first quantum computer (e.g., quantum computer 122a) based on the first potential impact to the current status information of the first quantum computer. The CSO agent 109 may be configured to calculate a first risk score of the plurality of risk scores by comparing the first future status information of the first quantum computer to a first risk criteria threshold associated with the first quantum computer. The CSO agent 109 may be configured to calculate a second future status information of the second quantum computer (e.g., quantum computer 122b) based on the second potential impact to the current status information of the second quantum computer. The CSO agent 109 may be configured to calculate a second risk score of the plurality of risk scores by comparing the second future status information of the second quantum computer to a second risk criteria threshold associated with the second quantum computer.

The CSO agent 109 may be configured to determine, based on the first risk score and the second risk score, to send the first block of the plurality of blocks to the first quantum computer instead of the second quantum computer.

The CSO agent 109 may be configured to generate a list indicating a plurality of risk scores associated with the quantum computing system 102. The CSO agent 109 may be configured to send the list to the application 270a to cause the application 270a to display the list on a screen. In some embodiments, the CSO agent 109 may be configured to send the list to one or more client devices 106, to cause each of the client device 106 to display the list their respective screens.

The CC system 104 includes a network interface 206a configured to establish a communication session with a computing device for sending and receiving data over the communication network 120 to the computing device. Accordingly, the network interface 206a includes a cellular transceiver (supporting cellular standards), a local wireless network transceiver (supporting 802.11X, ZigBee, Bluetooth, Wi-Fi, or the like), a wired network interface, a combination thereof (e.g., both a cellular transceiver and a Bluetooth transceiver), and/or the like. In some embodiments, the CC system 104 includes a plurality of network interfaces 206a of different types, allowing for connections to a variety of networks, such as local area networks (public or private) or wide area networks including the Internet, via different sub-networks.

The CC system 104 includes an input/output device 205a configured to receive user input from and provide information to a user. In this regard, the input/output device 205a is structured to exchange data, communications, instructions, etc. with an input/output component of the CC system 104. Accordingly, input/output device 205a may be any electronic device that conveys data to a user by generating sensory information (e.g., a visualization on a display, one or more sounds, tactile feedback, etc.) and/or converts received sensory information from a user into electronic signals (e.g., a keyboard, a mouse, a pointing device, a touch screen display, a microphone, etc.). The one or more user interfaces may be internal to the housing of CC system 104, such as a built-in display, touch screen, microphone, etc., or external to the housing of CC system 104, such as a monitor connected to CC system 104, a speaker connected to CC system 104, etc., according to various embodiments. In some embodiments, the CC system 104 includes communication circuitry for facilitating the exchange of data, values, messages, and the like between the input/output device 205a and the components of the CC system 104. In some embodiments, the input/output device 205a includes machine-readable media for facilitating the exchange of information between the input/output device 205a and the components of the CC system 104. In still another embodiment, the input/output device 205a includes any combination of hardware components (e.g., a touchscreen), communication circuitry, and machine-readable media.

The CC system 104 includes a device identification component 207a (shown in FIG. 2A as device ID component 207a) configured to generate and/or manage a device identifier associated with the CC system 104. The device identifier may include any type and form of identification used to distinguish the CC system 104 from other computing devices. In some embodiments, to preserve privacy, the device identifier may be cryptographically generated, encrypted, or otherwise obfuscated by any device and/or component of CC system 104. In some embodiments, the CC system 104 may include the device identifier in any communication (e.g., a message that includes the container image request, etc.) that the CC system 104 sends to a computing device.

The CC system 104 includes a bus (not shown), such as an address/data bus or other communication mechanism for communicating information, which interconnects the devices and/or components of CC system 104, such as processing device 202a, network interface 206a, input/output device 205a, and device ID component 207a.

In some embodiments, some or all of the devices and/or components of CC system 104 may be implemented with the processing device 202a. For example, the CC system 104 may be implemented as a software application stored within the memory 204a and executed by the processing device 202a. Accordingly, such embodiment can be implemented with minimal or no additional hardware costs. In some embodiments, any of these above-recited devices and/or components rely on dedicated hardware specifically configured for performing operations of the devices and/or components.

FIG. 2B is a block diagram depicting an example quantum computer 122 of the quantum computing system 102 in FIG. 1, according to some embodiments. While various devices, interfaces, and logic with particular functionality are shown, it should be understood that one or more quantum computers 122 of the quantum computing system 102 each include any number of devices and/or components, interfaces, and logic for facilitating the functions described herein. For example, the activities of multiple devices may be combined as a single device and implemented on a same processing device (e.g., processing device 202b), as additional devices and/or components with additional functionality are included.

The quantum computer 122 includes a quantum processing device 202b, which may be composed of one or more quantum processors, and a quantum memory 204b (e.g., synchronous dynamic random access memory (DRAM), read-only memory (ROM)), which may communicate with each other via a bus (not shown). A quantum processing device 202b may be implemented as one or more quantum logic gates or any other suitable electronic processing component configured to perform quantum computations using quantum bits or qubits. The quantum processing device 202b solves mathematical problems (e.g., integer factorization and discrete logarithms) by performing one or more quantum algorithms including, without limitation, algorithms based on quantum Fourier transform (e.g., Deutsch-Jozsa algorithm, Bernstein-Vazirani algorithm, Simon's algorithm, Quantum phase estimation algorithm, Shor's algorithm, Hidden subgroup problem, Boson sampling problem, Estimating Gauss sums, Fourier fishing and Fourier checking), algorithms based on amplitude amplification (e.g., Grover's algorithm, Quantum counting), algorithms based on quantum walks (e.g., element distinctness problem, triangle-finding problem, formula evaluation, group commutativity), and hybrid quantum/classical algorithms (e.g., quantum approximate optimization algorithm (QAOA), variational quantum Eigensolver).

The quantum memory 204b of processing device 202b stores data and/or computer instructions/code for facilitating at least some of the various processes described herein. The quantum memory 204b is configured to maintain a sequence of qubits representing a one, a zero, or any quantum superposition of those two qubit states. The quantum memory 204b is configured to maintain n qubits that can be in any superposition of up to $2^n$ different states. For example, a pair of qubits can be in any quantum superposition of 4 states, and 3 qubits in any superposition of 8 states. Conversely, bits of a classical computer (e.g., CC system 104 in FIG. 1A), may only be in one of these $2^n$ states at any one time.

The processing device 202a may execute a quantum support optimizer (QSO) agent 109 that is configured to expose APIs of its quantum hardware (e.g., qubits, memory, etc.) and/or applications (e.g., task manager, qubit registry, scheduler, etc.) that are executing on its quantum hardware to other quantum computers 122 and/or classical computers (e.g., CC system 104, client devices 106). By exposing the APIs, the other quantum computers 122 and/or classical computers may poll the APIs to acquire information about the one or more resources (e.g., qubits, memory, applications, etc.) of the quantum computer 122, and use the information to generate a snapshot of the quantum computer 122. The snapshot indicates a quantum hardware type, an application type, and a current status of the quantum hardware and applications.

Alternatively, the QSO agent 105 may generate a snapshot of the one or more resources of the quantum computer 122 in response to receiving a request (shown in FIG. 1 as, "system snapshot request") for the snapshot from the CC system 104. For example, the QSO agent 105 may poll the APIs of the quantum computer 122 in which the QSO agent 105 is executing upon to gather the quantum hardware and applications information, and use that information to generate a snapshot of the quantum computer 122

The QSO agent 105 may be configured to receive one or more blocks 112 (e.g., block 112-1, block 112-3) from the CC system 104. The QSO agent 105 may be configured to process each block 112 in order to generate a respective block output. The QSO agent 105 may be configured to send the one or more block outputs (shown in FIG. 1 as, "block outputs") to the CC system 104.

The quantum computer 122 includes a network interface 206*b* configured to establish a communication session with a computing device for sending and receiving data over a network to the computing device. The network interface 206*b* includes identical or nearly identical functionality as network interface 206*a* in FIG. 2A, but with respect to devices and/or components of the quantum computer 122 instead of devices and/or components of the CC system 104.

The quantum computer 122 includes an input/output device 205*b* configured to receive user input from and provide information to a user. In this regard, the input/output device 205*b* is structured to exchange data, communications, instructions, etc. with an input/output component of the quantum computer 122. The input/output device 205*b* includes identical or nearly identical functionality as input/output device 205*a* in FIG. 2A, but with respect to devices and/or components of the quantum computer 122 instead of devices and/or components of the CC system 104.

The quantum computer 122 includes a device identification component 207*b* (shown in FIG. 2B as device ID component 207*b*) configured to generate and/or manage a device identifier associated with the quantum computer 122. The device ID component 207*b* includes identical or nearly identical functionality as device ID component 207*a* in FIG. 2A, but with respect to devices and/or components of the quantum computer 122 instead of devices and/or components of the CC system 104.

The quantum computer 122 includes a bus (not shown), such as an address/data bus or other communication mechanism for communicating information, which interconnects the devices and/or components of the quantum computer 122, such as processing device 202*b*, network interface 206*b*, input/output device 205*b*, and/or device ID component 207*b*.

In some embodiments, some or all of the devices and/or components of quantum computer 122 may be implemented with the quantum processing device 202*b*. For example, the quantum computer 122 may be implemented as a software application stored within the quantum memory 204*b* and executed by the quantum processing device 202*b*. Accordingly, such embodiment can be implemented with minimal or no additional hardware costs. In some embodiments, any of these above-recited devices and/or components rely on dedicated hardware specifically configured for performing operations of the devices and/or components.

Figure 2C:
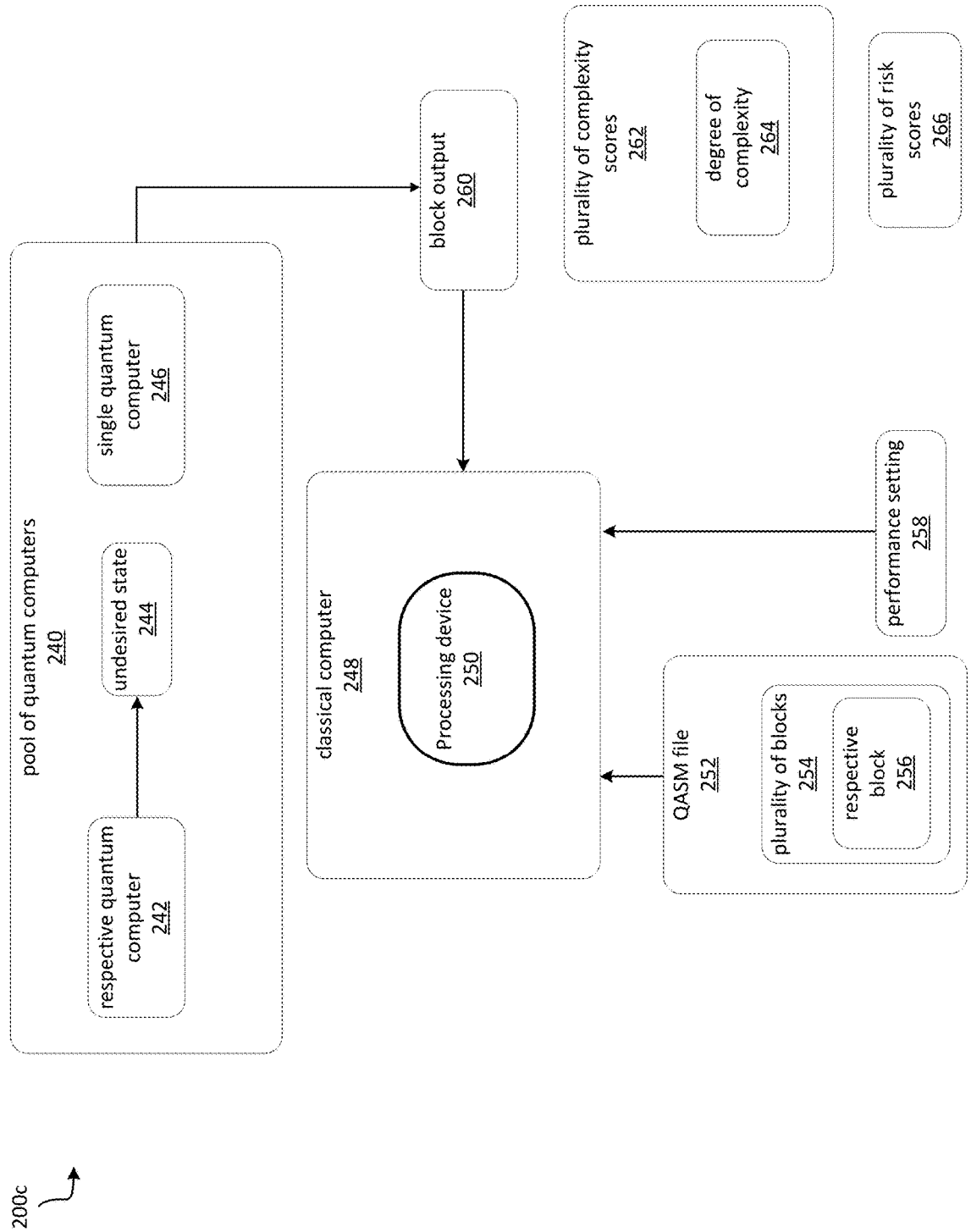
FIG. 2C is a block diagram depicting an example environment for selectively distributing blocks of a QASM file over resources of a quantum computing environment to optimize performance of the quantum computing environment, according to some embodiments.

FIG. 2C is a block diagram depicting an example environment for selectively distributing blocks of a QASM file over resources of a quantum computing environment to optimize performance of the quantum computing environment, according to some embodiments. The environment 200*c* includes a pool of quantum computers 240 (e.g., quantum computing system 102 in FIG. 1), that includes a respective quantum computer 242 (e.g., quantum computer 122*a*, 122*b*, or 122*c* in FIG. 1), an undesired state 244, and a single quantum computer 246 (e.g., quantum computer 122*a*, 122*b*, or 122*c* in FIG. 1). The environment 200*c* includes a classical computer 248 (e.g., CC system 104 in FIG. 1) that includes a processing device 250 (e.g., processing device 202*a*). The environment 200*c* includes a QASM file 252 (e.g., QASM file 111 in FIG. 1) that includes a plurality of blocks 254 (e.g., blocks 112-1, 112-2, and 112-3 in FIG. 1). The plurality of blocks 254 includes a respective block 256 (e.g., blocks 112-1, 112-2, or 112-3 in FIG. 1). The environment 200*c* includes a block output 260. The environment 200*c* includes a plurality of complexity scores 262 (e.g., complexity scores 114-1, 114-2, 114-3 in FIG. 1) that each indicate a degree of complexity 264. The environment 200*c* includes a plurality of risk scores 266.

The classical computer 248 receives the QASM file 252 and the performance setting 258 for the QASM file 252. The QASM file 252 includes the plurality of blocks 254. The classical computer 248 calculates the plurality of complexity scores 262 that are each indicative of the degree of complexity 264 to process a respective block 256 of the plurality of blocks 254 based on the performance setting 258. The classical computer 248 calculates, based on the plurality of complexity scores 262, the plurality of risk scores 266 that are associated with the pool of quantum computers 240. Each risk score of the plurality of risk scores 266 is indicative of a likelihood of a respective quantum computer 242 of the pool of quantum computers 240 entering the undesired state 244 responsive to processing the respective block 256 of the plurality of blocks 254. The classical computer 248 selectively distributes, based on the plurality of risk scores 266, each of the plurality of blocks 254 to a single quantum computer 246 of the pool of quantum computers 240 to cause the single quantum computer 246 to generate a block output 260 by processing the block and send the block output 260 to the processing device.

FIG. 3 is a flow diagram depicting a method for selectively distributing blocks of a QASM file over resources of a quantum computing environment to optimize performance of the quantum computing environment, according to some embodiments. Method 300 may be performed by processing logic that may comprise hardware (e.g., circuitry, dedicated logic, programmable logic, a processor, a processing device, a central processing unit (CPU), a system-on-chip (SoC), etc.), software (e.g., instructions and/or an application that is running/executing on a processing device), firmware (e.g., microcode), or a combination thereof. In some embodiments, method 300 may be performed by a classical computing system, such as CC system 104 in FIG. 1.

With reference to FIG. 3, method 300 illustrates example functions used by various embodiments. Although specific function blocks ("blocks") are disclosed in method 300, such blocks are examples. That is, embodiments are well suited to performing various other blocks or variations of the blocks recited in method 300. It is appreciated that the blocks in method 300 may be performed in an order different than presented, and that not all of the blocks in method 300 may be performed.

As shown in FIG. 3, the method 300 includes the block 302 of receiving a quantum assembly language (QASM) file and a performance setting for the QASM file, the QASM file comprising a plurality of blocks. The method 300 includes the block 304 of calculating a plurality of complexity scores each indicative of a degree of complexity to process a respective block of the plurality of blocks based on the performance setting. The method 300 includes the block 306 of calculating, by a processing device of a classical computer based on the plurality of complexity scores, a plurality of risk scores associated with a pool of quantum computers, each risk score is indicative of a likelihood of a respective quantum computer of the pool of quantum computers entering an undesired state responsive to processing a respective block of the plurality of blocks. The method 300 includes the block 304 of selectively distributing, based on the plurality of risk scores, each of the plurality of blocks to a single quantum computer of the pool of quantum computers to cause the single quantum computer to generate a block output by processing the block and send the block output to the processing device.

Figure 4:
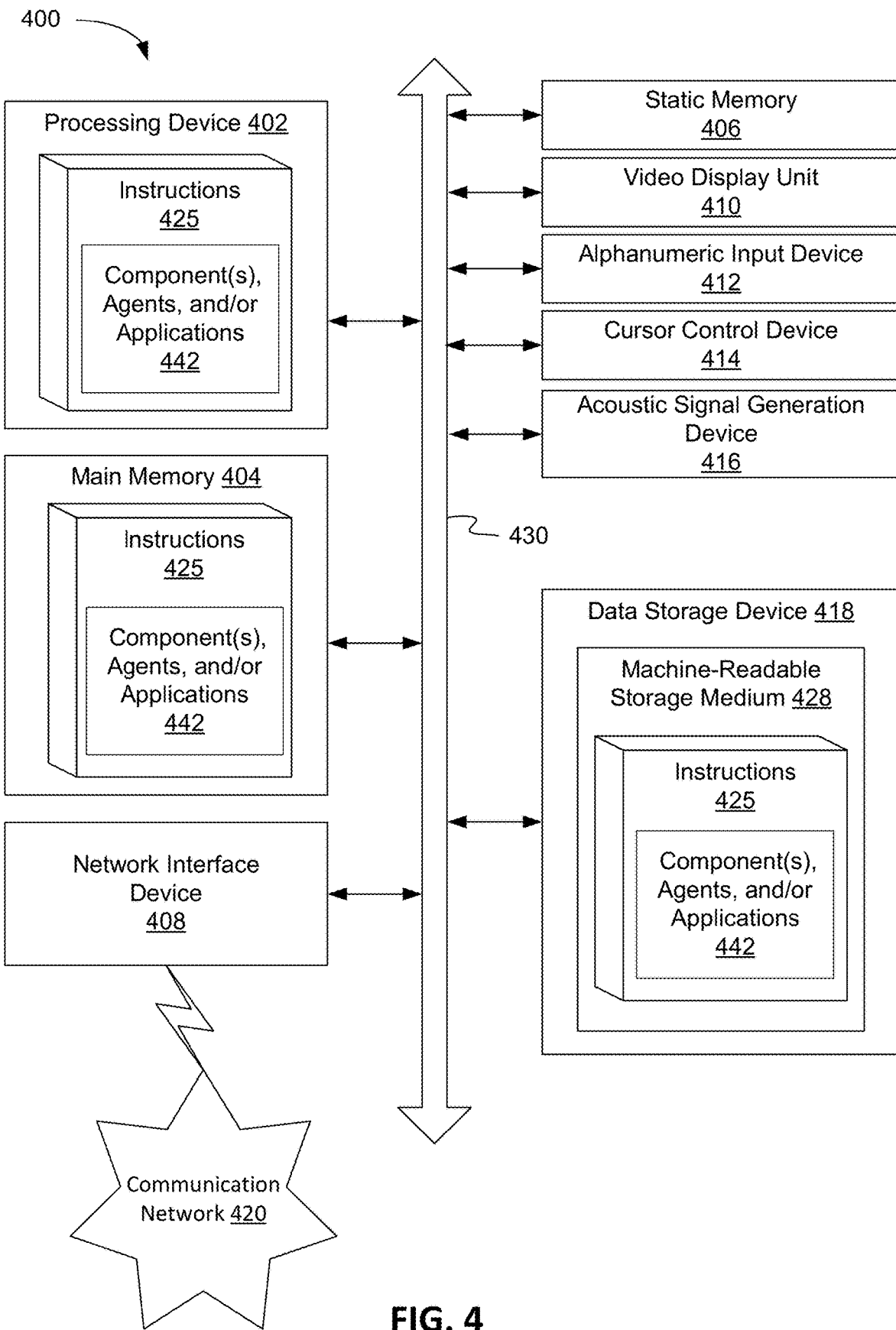
FIG. 4 is a block diagram of an example computing device that may perform one or more of the operations described herein, according to some embodiments.

FIG. 4 is a block diagram of an example computing device 400 that may perform one or more of the operations described herein, according to some embodiments. Computing device 400 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 400 may include a processing device (e.g., a general purpose processor, a PLD, etc.) 402, a main memory 404 (e.g., synchronous dynamic random access memory (DRAM), read-only memory (ROM)), a static memory 406 (e.g., flash memory and a data storage device 418), which may communicate with each other via a bus 430.

Processing device 402 may be provided by one or more general-purpose processing devices such as a microprocessor, central processing unit, or the like. In an illustrative example, processing device 402 may comprise a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 402 may also comprise one or more special-purpose processing devices such as an application specific integrated circuit (ASIC), a field programmable gate array (FPGA), a digital signal processor (DSP), network processor, or the like. The processing device 402 may be configured to execute the operations described herein, in accordance with one or more aspects of the present disclosure, for performing the operations and steps discussed herein.

Computing device 400 may further include a network interface device 408 which may communicate with a communication network 420. The computing device 400 also may include a video display unit 410 (e.g., a liquid crystal display (LCD) or a cathode ray tube (CRT)), an alphanumeric input device 412 (e.g., a keyboard), a cursor control device 414 (e.g., a mouse) and an acoustic signal generation device 416 (e.g., a speaker). In one embodiment, video display unit 410, alphanumeric input device 412, and cursor control device 414 may be combined into a single component or device (e.g., an LCD touch screen).

Data storage device 418 may include a computer-readable storage medium 428 on which may be stored one or more sets of instructions 425 that may include instructions for one or more components, agent, and/or applications 442 (e.g., CSO agent 109 in FIG. 1, QSO agent 105 in FIG. 2B) for carrying out the operations described herein, in accordance with one or more aspects of the present disclosure. Instructions 425 may also reside, completely or at least partially, within main memory 404 and/or within processing device 402 during execution thereof by computing device 400, main memory 404 and processing device 402 also constituting computer-readable media. The instructions 425 may further be transmitted or received over a communication network 420 via network interface device 408.

While computer-readable storage medium 428 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "calculating," "calculating," "distributing," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. § 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the present disclosure to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the present disclosure is not to be limited to the details given herein, but may be modified within the scope and equivalents of the appended claims.

What is claimed is:

1. A method comprising:

receiving a quantum assembly language (QASM) file and a performance setting for the QASM file, the QASM file comprising a plurality of blocks;

calculating, for each block of the plurality of blocks, a respective complexity score of a plurality of complexity scores, each complexity score of the plurality of complexity scores is indicative of a degree of complexity to process a respective block of the plurality of blocks based on the performance setting;

calculating, by a processing device of a classical computer based on the plurality of complexity scores, a plurality of risk scores associated with a pool of quantum computers, each risk score is indicative of a likelihood of a respective quantum computer of the pool of quantum computers entering an undesired state responsive to processing the respective block of the plurality of blocks; and selectively distributing, based on the plurality of risk scores, each of the plurality of blocks to a single quantum computer of the pool of quantum computers to cause the single quantum computer to generate a block output by processing the block and send the block output to the processing device.

2. The method of claim 1, wherein calculating the plurality of complexity scores that are each indicative of the degree of complexity to process the respective block of the plurality of blocks based on the performance setting comprises:

parsing the QASM file to identify each block of the plurality of blocks; and determining, for each block of the plurality of blocks, resource requirements for processing the block according to the performance setting.

3. The method of claim 1, further comprising:

polling, for each quantum computer of the pool of quantum computers, one or more application programming interfaces (API) of the quantum computer to obtain a plurality of snapshots associated with the pool of quantum computers, wherein each snapshot of the plurality of snapshots indicates a current status of one or more resources of a respective quantum computer of the pool of quantum computers, wherein the calculating, based on the plurality of complexity scores, the plurality of risk scores associated with the pool of quantum computers is further based on the plurality of snapshots associated with the pool of quantum computers.

4. The method of claim 3, wherein the current status of one or more resources of the quantum computer is indicative of at least one of a current qubit availability, a current system noise, a current error count, a current temperature, a current processing load, or a current availability of services.

5. The method of claim 1, wherein the performance setting is indicative of at least one of a processing speed, a processing accuracy, or a processing efficiency.

6. The method of claim 3, wherein calculating, based on the plurality of complexity scores, the plurality of risk scores associated with the pool of quantum computers comprises:
determining, for a first quantum computer of the pool of quantum computers, a first potential impact to the current status of the first quantum computer responsive to processing a first block of the plurality of blocks; and
determining, for a second quantum computer of the pool of quantum computers, a second potential impact to the current status of the second quantum computer responsive to processing the first block of the plurality of blocks.

7. The method of claim 6, further comprising:
calculating a first future status information of the first quantum computer based on the first potential impact to the current status of the first quantum computer;
calculating a first risk score of the plurality of risk scores by comparing the first future status information of the first quantum computer to a first risk criteria threshold associated with the first quantum computer;
calculating a second future status information of the second quantum computer based on the second potential impact to the current status of the second quantum computer;
calculating a second risk score of the plurality of risk scores by comparing the second future status information of the second quantum computer to a second risk criteria threshold associated with the second quantum computer; and
determining, based on the first risk score and the second risk score, to send the first block of the plurality of blocks to the first quantum computer instead of the second quantum computer.

8. The method of claim 6, further comprising:
generating a list indicating the plurality of risk scores associated with the pool of quantum computers; and
causing an application to present the list on a display.

9. The method of claim 1, further comprising:
receiving the plurality of block outputs from the pool of quantum computers;
aggregating the plurality of block outputs into an aggregated block output; and
sending the aggregated block output to an application executing on the processing device of the classical computer or on a second classic computer.

10. The method of claim 9, wherein aggregating the block outputs into the aggregated block output comprises:
determining an order of the plurality of blocks within the QASM file; and
arranging the block outputs within the aggregated block output based on the order.

11. A system comprising:
a memory; and
a processing device, operatively coupled to the memory, to:
receive a quantum assembly language (QASM) file and a performance setting for the QASM file, the QASM file comprising a plurality of blocks;
calculate, for each block of the plurality of blocks, a respective complexity score of a plurality of complexity scores, each complexity score of the plurality of complexity scores is indicative of a degree of complexity to process a respective block of the plurality of blocks based on the performance setting;
calculate, based on the plurality of complexity scores, a plurality of risk scores associated with a pool of quantum computers, each risk score is indicative of a likelihood of a respective quantum computer of the pool of quantum computers entering an undesired state responsive to processing the respective block of the plurality of blocks; and
selectively distribute, based on the plurality of risk scores, each of the plurality of blocks to a single quantum computer of the pool of quantum computers to cause the single quantum computer to generate a block output by processing the block and send the block output to the processing device.

12. The system of claim 11, wherein to calculate the plurality of complexity scores that are each indicative of the degree of complexity to process the respective block of the plurality of blocks based on the performance setting, the processing device to:
parse the QASM file to identify each block of the plurality of blocks; and
determine, for each block of the plurality of blocks, resource requirements for processing the block according to the performance setting.

13. The system of claim 11, wherein the processing device to:
poll, for each quantum computer of the pool of quantum computers, one or more application programming interfaces (API) of the quantum computer to obtain a plurality of snapshots associated with the pool of quantum computers, wherein each snapshot of the plurality of snapshots indicates a current status of one or more resources of a respective quantum computer of the pool of quantum computers,
wherein to calculate, based on the plurality of complexity scores, the plurality of risk scores associated with the pool of quantum computers is further based on the plurality of snapshots associated with the pool of quantum computers.

14. The system of claim 13, wherein the current status of one or more resources of the quantum computer is indicative of at least one of a current qubit availability, a current system noise, a current error count, a current temperature, a current processing load, or a current availability of services.

15. The system of claim 11, wherein the performance setting is indicative of at least one of a processing speed, a processing accuracy, or a processing efficiency.

16. The system of claim 13, wherein to calculate, based on the plurality of complexity scores, the plurality of risk scores associated with the pool of quantum computers comprises:
determine, for a first quantum computer of the pool of quantum computers, a first potential impact to the current status of the first quantum computer responsive to processing a first block of the plurality of blocks; and
determine, for a second quantum computer of the pool of quantum computers, a second potential impact to the current status of the second quantum computer responsive to processing the first block of the plurality of blocks.

17. The system of claim 16, wherein the processing device to:
calculate a first future status information of the first quantum computer based on the first potential impact to the current status of the first quantum computer;
calculate a first risk score of the plurality of risk scores by comparing the first future status information of the first quantum computer to a first risk criteria threshold associated with the first quantum computer;

calculate a second future status information of the second quantum computer based on the second potential impact to the current status of the second quantum computer;

calculate a second risk score of the plurality of risk scores by comparing the second future status information of the second quantum computer to a second risk criteria threshold associated with the second quantum computer; and determine, based on the first risk score and the second risk score, to send the first block of the plurality of blocks to the first quantum computer instead of the second quantum computer.

18. The system of claim 11, wherein the processing device to:

receive the plurality of block outputs from the pool of quantum computers;

aggregate the plurality of block outputs into an aggregated block output; and send the aggregated block output to an application executing on the processing device of the classical computer or on a second classic computer.

19. The system of claim 18, wherein to aggregate the block outputs into the aggregated block output, the processing device to:

determine an order of the plurality of blocks within the QASM file; and arrange the block outputs within the aggregated block output based on the order.

20. A non-transitory computer-readable medium storing instructions that, when executed by a processing device, cause the processing device to:

receive a quantum assembly language (QASM) file and a performance setting for the QASM file, the QASM file comprising a plurality of blocks;

calculate, for each block of the plurality of blocks, a respective complexity score of a plurality of complexity scores, each complexity score of the plurality of complexity scores is indicative of a degree of complexity to process a respective block of the plurality of blocks based on the performance setting;

calculate, by the processing device of a classical computer based on the plurality of complexity scores, a plurality of risk scores associated with a pool of quantum computers, each risk score is indicative of a likelihood of a respective quantum computer of the pool of quantum computers entering an undesired state responsive to processing the respective block of the plurality of blocks; and selectively distribute, based on the plurality of risk scores, each of the plurality of blocks to a single quantum computer of the pool of quantum computers to cause the single quantum computer to generate a block output by processing the block and send the block output to the processing device.

* * * * *